US012517162B2

(12) United States Patent
Chung et al.

(10) Patent No.: US 12,517,162 B2
(45) Date of Patent: Jan. 6, 2026

(54) NOISE INFLOW ANALYSIS APPARATUS AND METHOD

(71) Applicant: SAMSUNG SDI CO., LTD., Yongin-si (KR)

(72) Inventors: Mooil Chung, Yongin-si (KR); Seongjin Mun, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 150 days.

(21) Appl. No.: 18/380,908

(22) Filed: Oct. 17, 2023

(65) Prior Publication Data
US 2024/0353461 A1 Oct. 24, 2024

(30) Foreign Application Priority Data
Apr. 24, 2023 (KR) .................. 10-2023-0053551

(51) Int. Cl.
G01R 29/08 (2006.01)
G01R 31/36 (2020.01)
G01R 31/392 (2019.01)

(52) U.S. Cl.
CPC ..... *G01R 29/0892* (2013.01); *G01R 31/3646* (2019.01); *G01R 31/392* (2019.01)

(58) Field of Classification Search
None
See application file for complete search history.

(56) References Cited

U.S. PATENT DOCUMENTS

2006/0132117 A1* 6/2006 Thomason ........... G01R 31/002
324/96
2007/0024293 A1* 2/2007 Kosaka ................ G01R 31/001
324/754.21
(Continued)

FOREIGN PATENT DOCUMENTS

CN 111487546 A 8/2020
DE 295 20 374 U1 2/1996
(Continued)

OTHER PUBLICATIONS

Extended European Search Report dated Mar. 25, 2024, for corresponding European Patent Application No. 23204484.2.

*Primary Examiner* — Jas A Sanghera
(74) *Attorney, Agent, or Firm* — Lee IP Law, P.C.

(57) ABSTRACT

An electromagnetic noise penetration analysis apparatus for analyzing electromagnetic wave noise penetrating a battery management device may include a plurality of internal electrical components grouped as function blocks based on each collective function. The electromagnetic noise penetration analysis apparatus may include one near-field measurement probe positioned near or adjacent to at least one electrical component of an associated function block, the electrical component being previously identified by associated monitoring data operating abnormally during an electromagnetic wave immunity test at a susceptible frequency, and configured to measure intensity of magnetic field near or at the identified electrical component, while simulated electromagnetic noise of a frequency comparable to the susceptible frequency is applied. An analyzer may be configured to quantify intensity of electromagnetic wave noise received by the electrical component represented by the function block based on the intensity of magnetic field measured by the near-field measurement probe.

20 Claims, 8 Drawing Sheets

(56) References Cited

U.S. PATENT DOCUMENTS

| | | |
|---|---|---|
| 2015/0084623 A1 | 3/2015 | Hwang et al. |
| 2017/0168101 A1 | 6/2017 | Inami et al. |
| 2017/0215274 A1 | 7/2017 | Yan et al. |
| 2018/0056800 A1* | 3/2018 | Meichle ................ B60L 53/305 |
| 2020/0315712 A1* | 10/2020 | Jasperson ............ G01R 33/007 |

FOREIGN PATENT DOCUMENTS

| | | |
|---|---|---|
| GB | 2501612 A | 10/2013 |
| JP | 10-185974 A | 7/1998 |
| KR | 10-0198806 B1 | 6/1999 |
| KR | 10-1270877 B1 | 6/2013 |
| KR | 10-2020-0086471 A | 7/2020 |

* cited by examiner

NOISE INFLOW ANALYSIS APPARATUS AND METHOD

CROSS-REFERENCE TO RELATED APPLICATION

This application claims priority to and the benefit of Korean Patent Application No. 10-2023-0053551 filed in the Korean Intellectual Property Office on Apr. 24, 2023, the entire contents of which are incorporated herein by reference.

BACKGROUND

1. Field

The present disclosure relates to an electromagnetic noise penetration analysis apparatus and method.

2. Description of the Related Art

The electromagnetic susceptibility (EMS) test is an immunity test to check that the normal operation of the device under test (DUT) is not adversely affected by electromagnetic waves that may be encountered in its operating environment. The EMS test may be conducted by supplying simulated electromagnetic noise to the device.

Since the EMS test for a battery management device conventionally determines whether the device operates normally based on functional state variables obtained at the outside of the battery management device, the degree of influence of the electromagnetic wave noise applied to the battery management device on individual internal electrical components represented by function blocks of the battery management device is not considered. Therefore, there is a limit during the design stage to knowing a risk of abnormal operation from electromagnetic noise penetrating the battery management device to reach internal electrical components represented by function blocks, a until the actual test is performed.

SUMMARY

At least one embodiment of the embodiments is to provide a noise penetration analysis device and method capable of quantifying the degree of influence of electromagnetic wave noise applied during an EMS test on electrical components represented by function blocks of a battery management device.

According to an embodiment, an electromagnetic noise penetration analysis apparatus for analyzing electromagnetic wave noise penetrating a battery management device that manages at least one battery module and comprises a plurality of internal electrical components represented by function blocks may be provided. The electromagnetic noise penetration analysis apparatus includes at least one near-field measurement probe positioned near or adjacent at least one electrical component represented by at least one function block associated with first monitoring data operating abnormally during an electromagnetic wave immunity test, and configured to measure magnetic field intensity while electromagnetic noise, of a frequency that was applied when the first monitoring data was identified in the electromagnetic wave immunity test, is applied; and an analyzer configured to quantify strength of electromagnetic wave noise received by the at least one electrical component represented by the at least one function block based on intensity of magnetic field as measured by the at least one near-field measurement probe.

The electromagnetic noise penetration analysis apparatus may further include a receiver configured to obtain frequency information of electromagnetic noise applied when the first monitoring data is obtained in the electromagnetic wave immunity test and the first monitoring data.

The at least one near-field measurement probe may be configured to respond to the frequency applied when the first monitoring data is obtained.

The position of the at least one electrical component represented by the at least one function block may include a position along a path connected to the at least one electrical component represented by the at least one function block.

According to another embodiment, a method for analyzing electromagnetic wave noise penetrating a device under test for testing electromagnetic wave immunity may be provided. The method includes: obtaining first data that operate abnormally during an electromagnetic wave immunity test at a particular frequency of electromagnetic wave noise applied to the device under test; measuring intensity of magnetic field using at least one near-field measurement probe positioned near at least one electrical component represented by at least one function block associated with the first monitoring data among a plurality of electrical components represented by a plurality of function blocks included in the device under test while the electromagnetic wave noise is applied; and quantifying intensity of electromagnetic wave noise received by the at least one electrical component based on measured intensity of the magnetic field.

The at least one near-field measurement probe may be configured to respond to the particular frequency applied when the first monitoring data was identified as operating abnormally.

The position of the at least one electrical component represented by the at least one function block may include a position along a path connected to the at least one electrical component represented by the at least one function block and/or near or adjacent the at least one electrical component.

The device under test may be a battery management device that manages at least one battery module.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
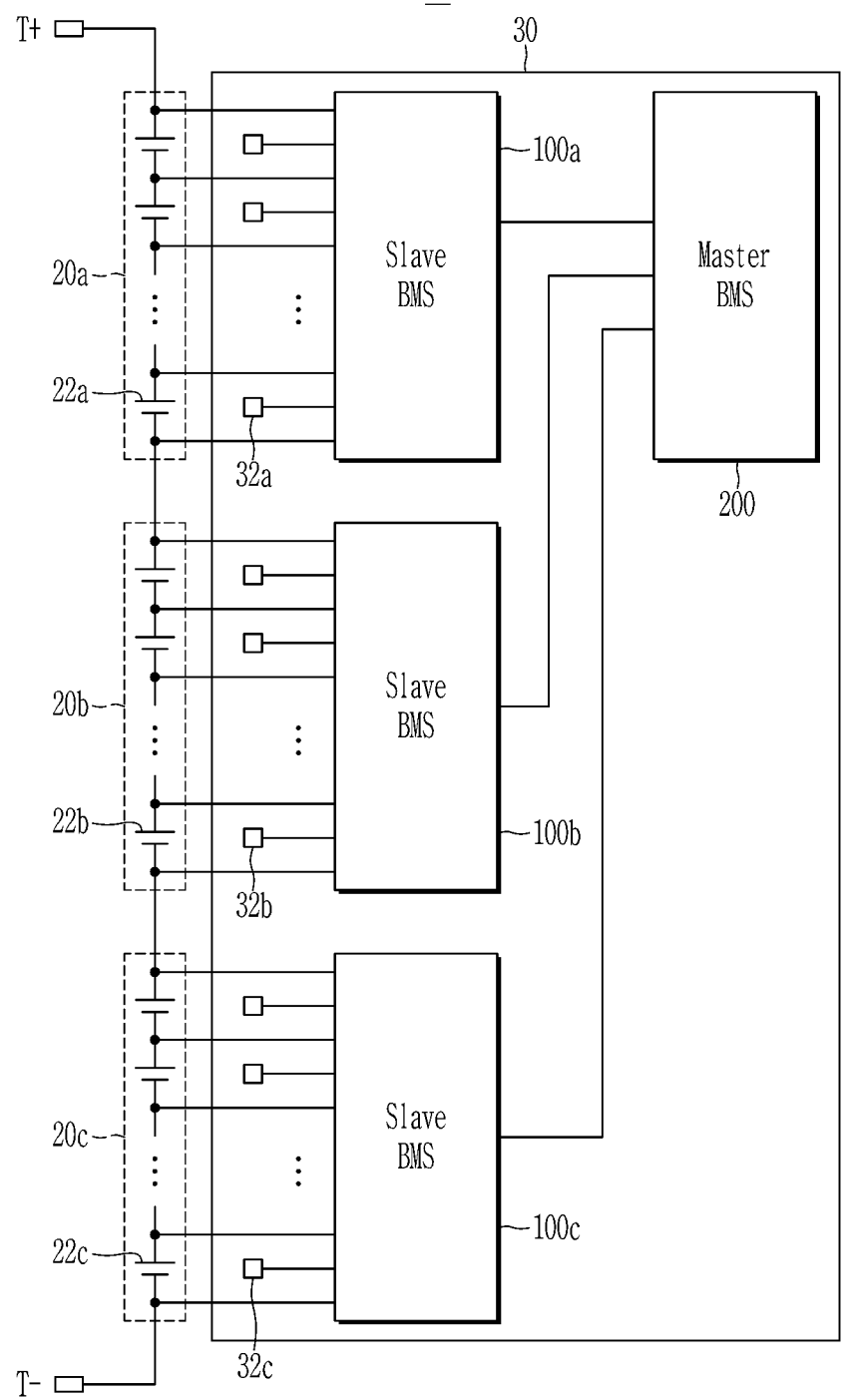
FIG. 1 is a schematic diagram showing a battery pack according to an exemplary embodiment.

Example embodiments will now be described more fully hereinafter with reference to the accompanying drawings. These embodiments may be embodied in different forms and should not be construed as limited to the embodiments set forth herein. Rather, these embodiments are provided so that this disclosure will be thorough and complete, and will fully convey exemplary implementations to those skilled in the art.

In the drawing figures, depicted function blocks may be arranged in any order and in any geometric configuration when implemented as physical circuitry with function, as is known to those of ordinary skill in the art.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification. In the flowchart described with reference to the drawings in this specification, the order of operations may be changed, several operations may be merged, some operations may be divided, and specific operations may not be performed.

Throughout the specification and claims, when a part is referred to "include" a certain element, it means that it may further include other elements rather than exclude other elements, unless specifically indicated otherwise.

In addition, expressions described in the singular may be interpreted in the singular or plural.

In addition, terms including an ordinal number, such as first, second, etc., may be used to describe various elements, but the elements are not limited by the terms. The above terms are used only for the purpose of distinguishing one element from another element.

Furthermore, when a component is referred to be "connected" with another component, it includes not only the case where two components are "directly connected" but also the case where two components are "indirectly or non-contactedly connected" with another component interposed therebetween, or the case where two components are "electrically connected." On the other hand, when an element is referred to as "directly connected" to another element, it should be understood that no other element exists in the middle.

FIG. 1 is a schematic diagram showing a battery pack 10 according to an exemplary embodiment. The battery pack 10 may be deployed or mounted in various power devices that use electrical energy stored in the battery pack 10, such as an electric vehicle. The battery pack 10 may include a plurality of battery modules 20a, 20b, and 20c connected in series with each other and the battery management device 30.

The plurality of battery modules 20a, 20b, and 20c connected in series with each other may be connected to an external charging device or load through system terminals T+ and T−, and may be charged by the charging device or discharged by the load.

The battery module 20a may include a plurality of battery cells 22a electrically connected to each other in series and/or parallel. The battery module 20b may include a plurality of battery cells 22b electrically connected to each other in series and/or parallel. The battery module 20c may include a plurality of battery cells 22c electrically connected to each other in series and/or parallel.

The battery management device 30 may manage the battery modules 20a, 20b, and 20c by monitoring the voltages, currents, and temperatures of the battery modules 20a, 20b, and 20c. The battery management device 30 may include a plurality of slave battery management systems (BMS) 100a, 100b, and 100c and a master BMS 200. Hereinafter, for convenience of explanation and as an embodiment, as depicted in FIG. 1, it will be described that the battery pack 10 includes three battery modules 20a, 20b and 20c, and the wireless battery management device 30 includes three slave BMS 100a, 100b, and 100c.

The plurality of slave BMSs 100a, 100b, and 100c may be installed to correspond to the plurality of battery modules 20a, 20b, and 20c included in the battery pack 10 on a one-to-one basis. Each of the plurality of slave BMSs 100a, 100b, and 100c may be electrically connected to any one battery module 20a, 20b, and 20c in which it is installed among the plurality of battery modules 20a, 20b, and 20c. For example, the slave BMS 100a may be electrically connected to the battery module 20a, the slave BMS 100b may be electrically connected to the battery module 20b, and the slave BMS 100c may be electrically connected to the battery module 20c.

Each of the plurality of slave BMSs 100a, 100b, and 100c may be electrically connected to at least one temperature sensor 32a, 32b, and 32c. The at least one temperature sensor 32a, 32b, and 32c may measure the temperature of the corresponding battery module 20a, 20b, and 20c, respectively.

Each of the plurality of slave BMSs 100a, 100b, and 100c may measure information of the corresponding battery modules 20a, 20b, and 20c and transmit the measured information to the master BMS 200. The information of the battery modules 20a, 20b, and 20c may include, for example, the currents and voltages of the battery modules 20a, 20b, and 20c, the voltages and temperatures of the battery cells 22a, 22b, and 22c, and the ambient temperature.

The master BMS 200 may periodically obtain information about the battery modules 20a, 20b, and 20c measured by the plurality of slave BMSs 100a, 100b, and 100c. The master BMS 200 may perform control functions such as state of charge (SOC), power control, cell balancing control, failure diagnosis control, cooling control, and thermal runaway detection control based on the information of the battery modules 20a, 20b, and 20c obtained from the plurality of slave BMSs 100a, 100b, and 100c. In addition, the master BMS 200 may control a relay for supplying and disconnecting the power of the battery modules 20a, 20b, and 20c to and from the load based on the information of the battery modules 20a, 20b, and 20c.

The master BMS 200 may be connected to a plurality of slave BMSs 100a, 100b, and 100c through wired communication lines. The master BMS 200 may be connected to a plurality of slave BMSs 100a, 100b, and 100c using a wireless network as a connection method.

Figure 2:
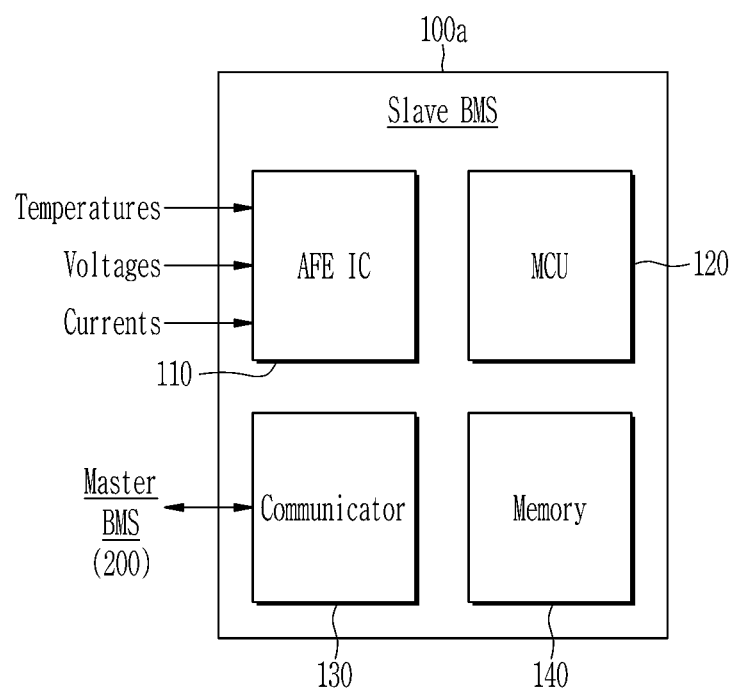
FIG. 2 is a schematic diagram showing an example of a slave BMS shown in FIG. 1.

FIG. 2 is a schematic diagram showing an example of a slave BMS 100a shown in FIG. 1. The slave BMS 100a may include an analog front end (AFE) integrated circuit (IC) 110, a micro control unit (MCU) 120, a communicator 130, and a memory 140.

The AFE IC 110 may be electrically connected to at least one temperature sensor 32a. The AFE IC 110 may be electrically connected to both ends of the battery module 20a. In addition, the AFE IC 110 may be electrically connected to both ends of each battery cell 22a constituting the battery module 20a. The AFE IC 110 may measure monitoring data such as voltages, currents, temperatures, remaining power amount, lifespan, and state of charge of the battery module 20a including at least one battery cell 22a. Here, while the AFE IC 110 measures monitoring data, the master BMS 200 may measure the charging current and discharging current of the battery module 20a.

The MCU 120 performs various control functions (e.g., charging, discharge, balancing) for adjusting the state of the battery module 20a electrically connected thereto, based on the monitoring data of the battery module 20a measured by the AFE IC 110. At this time, each control function is directly performed by each slave BMS 100a, 100b, and 100c based on the state of the battery module 20a, 20b, and 20c or may be performed according to a command from the master BMS 200.

The communicator 130 may communicate with the master BMS 200. The communicator 130 may transmit monitoring data of the battery module 20a measured by the AFE IC 110 to the master BMS 200.

The memory 140 may store monitoring data of the battery module 20a measured by the AFE IC 110.

Figure 3:
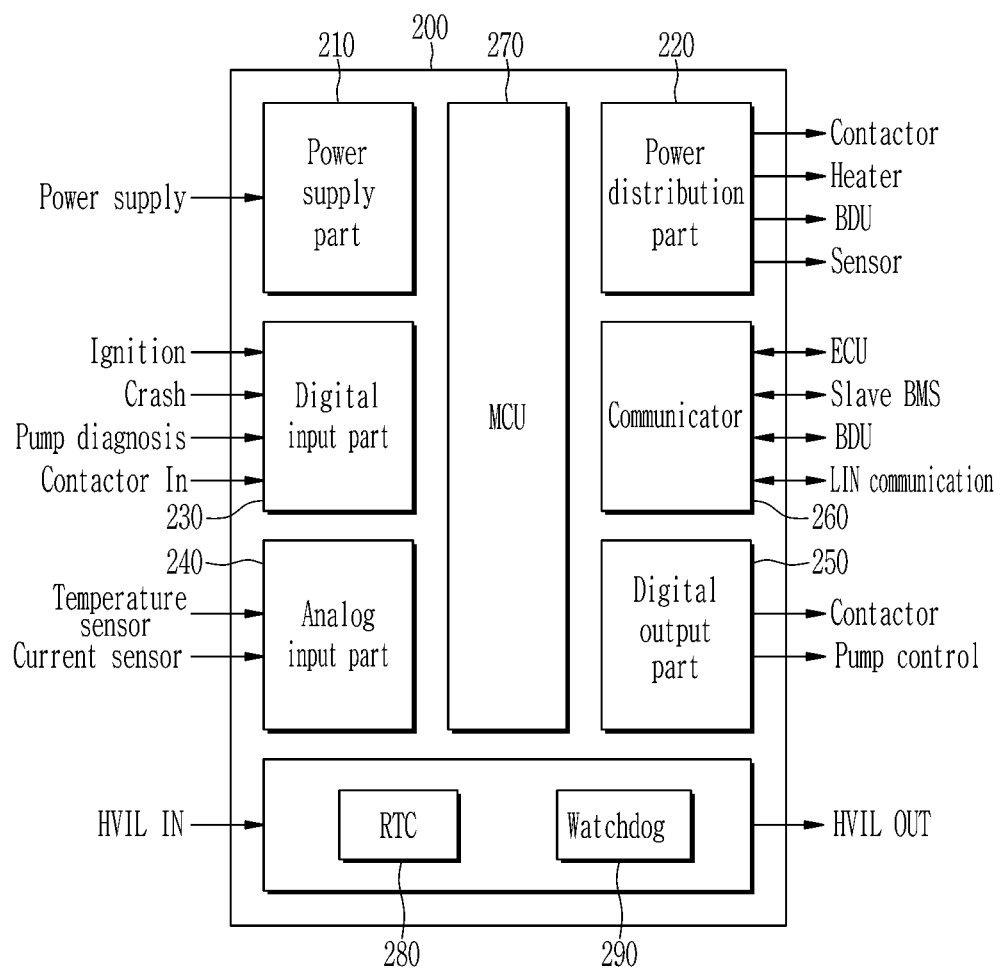
FIG. 3 is a schematic diagram showing an example of a master BMS shown in FIG. 1.

FIG. 3 is a schematic diagram showing an example of a master BMS 200 shown in FIG. 1. The master BMS 200 may include a power supply part 210, a power distribution part 220, a digital input part 230, an analog input part 240, a digital output part 250, a communicator 260, and an MCU 270.

The power supply part 210 may protect function blocks of the master BMS 200 from overcurrent or noise coming through a power supply connected to drive the master BMS 200.

The power distribution part 220 may convert power connected to drive the master BMS 200 according to input power specifications of a load connected to the master BMS 200 and supply the converted power to a corresponding load. The power distribution part 220 may distribute and supply power to loads such as, for example, a contactor, a battery disconnecting unit (BDU), a sensor, and a heater.

The digital input part 230 may receive various digital signals and transmit the received digital signals to the MCU 270. The digital signal includes, for example, an ignition signal Ignition for switching the battery management device 30 from a sleep mode to an active mode as an ignition device is turned on if the vehicle is started, and a collision detection signal Crash of the vehicle, a pump diagnosis signal Pump Diagnosis received from the oil pump controller, and a signal Contactor In confirming that the contactor is operating normally.

The analog input part 240 may receive information sensed from various sensors inside the battery pack 10 and transmit the sensed information to the MCU 270. Various sensors inside the battery pack 10 may include, for example, a temperature sensor for measuring the temperature of the battery pack 10 or a current sensor for sensing the amount of current supplied from the battery pack 10 to a load.

The digital output part 250 may output a switch control signal transmitted from the MCU 270 to a switch such as a relay or a contactor, and may output a pump control signal to a pump.

The communicator 260 may perform communication with an external controller of the battery pack 10, slave BMSs 100a, 100b, and 100c, and a BDU. The external controller of the battery pack 10 may include, for example, a vehicle controller such as an electronic control unit (ECU). The communicator 260 may perform controller area network (CAN) communication with an external controller or BDU of the battery pack 10. Also, the communicator 260 may support Local Interconnect Network (LIN) communication.

The MCU 270 may manage the status of the slave BMSs 100a, 100b, and 100c, and may perform control functions such as SOC, power limitation, cell balancing, fault diagnosis, cooling control, etc. based on the monitoring data received from the slave BMSs 100a, 100b, and 100c, and control a switch such as a relay or contactor. In addition, the MCU 270 may perform a fault diagnosis function of the battery pack 10 based on monitoring data received from the slave BMSs 100a, 100b, and 100c and monitoring data sensed by various sensors. The MCU 270 may detect various failures such as overvoltage, undervoltage, battery cell failure, current sensor failure, temperature sensor failure, disconnection/short circuit, cooling fan failure, communication failure, and relay fusion.

The MCU 270 may output switch control signals to switches such as a relay or contactor to supply or cut off the power of the battery pack 10 to a load and output a control pump control signal for adjusting the speed of the pump to match the proper temperature of the battery cells.

The MCU 270 may diagnose each digital signal according to predetermined algorithms using various digital signals input through the digital input part 230 and cut off the power of the battery pack 10 based on the diagnosis result or transmit a warning signal for an abnormal situation to the vehicle.

In addition, the MCU 270 may detect a connection state of the battery through a high voltage interlock loop (HVIL) and may cut off power supply of the battery pack 10 based on the connection state of the battery.

The master BMS 200 may further include, for example, an electrical component or combination of components represented by a function block corresponding to a real time clock (RTC) 280 or a watchdog 290 in addition to the aforementioned power supply part 210, power distribution part 220, digital input part 230, analog input part 240, digital output part 250, communicator 260, and MCU 270.

The RTC 280 provides a clock function that operates within the master BMS 200 and may record the time when an event that meets a predetermined condition of a non-active state or a function to be monitored occurs.

The watchdog 290 may perform a function of safely opening a switch such as a relay or contactor if a failure occurs in the MCU 270.

The function blocks representing electrical components of the master BMS 200 shown in FIG. 3 are just one example, and electrical components represented by additional function blocks may be included.

Figure 4:
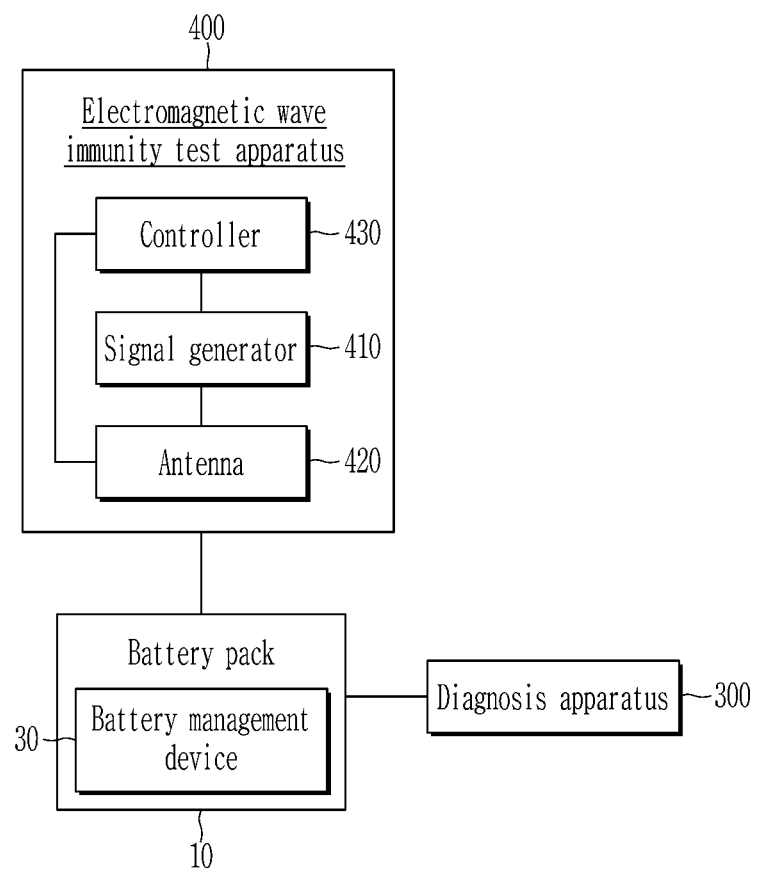
FIG. 4 is a schematic diagram showing an electromagnetic wave immunity test apparatus according to an embodiment.

FIG. 4 is a schematic diagram showing an electromagnetic wave immunity test apparatus 400 according to an embodiment. The electromagnetic wave immunity test apparatus 400 is a device that generates electromagnetic wave noise and radiates it to the battery management device 30 of the battery pack 10 for the electromagnetic wave immunity test.

The electromagnetic wave immunity test apparatus 400 may include a signal generator 410, an antenna 420, and a controller 430.

The signal generator 410 may generate electromagnetic wave noise for the immunity test according to the control of the controller 430. The electromagnetic wave noise of 100 kHz to 6 GHz can be used for the electromagnetic wave immunity test of automobiles. The signal generator 410 may be capable of generating any frequency of electromagnetic wave noise over the entire frequency band while changing the frequency according to the control of the controller 430 so as to test electromagnetic wave immunity across the entire frequency band at individual frequencies.

The antenna 420 may radiate electromagnetic wave noise generated under the control of the controller 430.

The electromagnetic wave noise may be externally applied to the battery management device 30 from the antenna 420, or may be electrically applied to a harness connected to a communicator through which the battery management device 30 communicates with the controller of the vehicle. Furthermore, the electromagnetic wave noise may be electrically applied to a harness connected to other devices of the vehicle using the high voltage output from the battery module or the low voltage supplied from the battery management device 30.

The controller 430 may control the signal generator 410 and the antenna 420. The controller 430 may control the signal generator 410 and the antenna 420 to test electromagnetic wave immunity over the entire frequency band.

For example, the signal generator 410 may generate electromagnetic wave noise of a first frequency under the control of the controller 430, and the antenna 420 may radiate electromagnetic wave noise of the first frequency for a set time under the control of the controller 430. Next, the signal generator 410 may generate electromagnetic wave noise of a second frequency by changing the frequency under the control of the controller 430, and the antenna 420 may radiate electromagnetic wave noise of the second frequency for a set time under the control of the controller 430. In this way, the controller 430 may control the signal generator 410 and the antenna 420 to test electromagnetic wave immunity over the entire frequency band.

The diagnosis apparatus 300 may be connected to the battery pack 10 to which electromagnetic noise is radiated, for example, the battery management device 30 of the battery pack 10.

When electromagnetic noise is radiated, the battery management device 30 may collect information observed or monitored by the battery management device 30, and transmit the collected observed or monitored data to the diagnosis apparatus 300.

The diagnosis apparatus 300 may diagnose electromagnetic wave immunity of the battery management device 30, based on radiation time of the electromagnetic wave noise from the electromagnetic wave immunity test apparatus 400, electromagnetic wave noise frequency, and the monitored data collected by the battery management device 30 in response to radiation of electromagnetic noise.

The diagnosis apparatus 300 may output an electromagnetic wave immunity diagnosis result of the battery management device 30. The electromagnetic wave immunity diagnosis result may include a monitoring variable (data) operating abnormally during the process of applying the electromagnetic wave noise and a frequency range of the electromagnetic wave noise applied causing abnormal operation.

The diagnosis apparatus 300 may detect an abnormality from the battery management device 30 of the battery pack 10 and generate a warning signal if an abnormality occurs and/or may perform a diagnosis operation.

Figure 5:
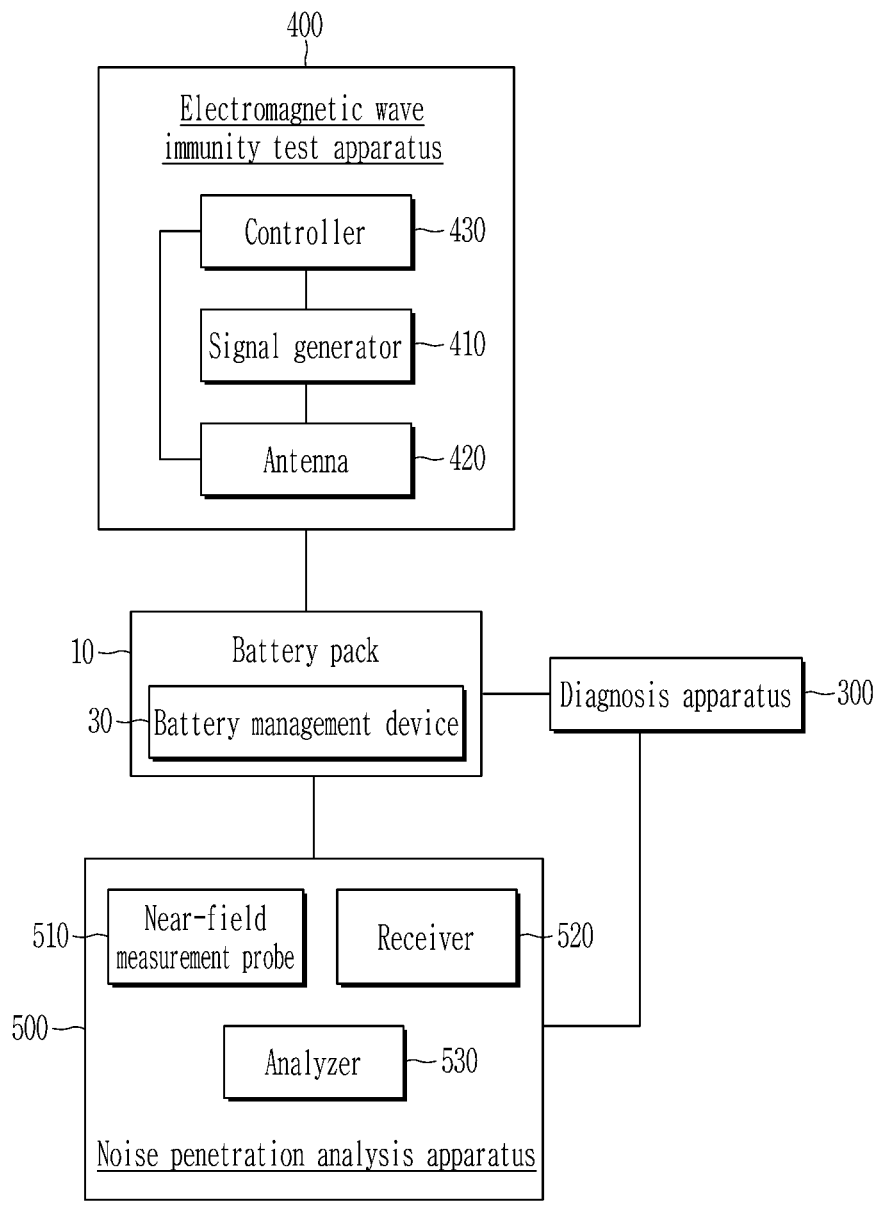
FIG. 5 is a schematic diagram showing a noise penetration analysis apparatus according to an embodiment.

FIG. 5 is a schematic diagram showing an electromagnetic wave immunity test apparatus 400, a battery pack 10, a diagnosis apparatus 300, and a noise penetration analysis apparatus 500 according to an embodiment. The noise penetration analysis apparatus 500 may include at least one near-field measurement probe 510, a receiver 520, and an analyzer 530.

The receiver 520 may receive information including a monitoring variable operating abnormally in the process of applying the electromagnetic wave noise and a corresponding frequency range. The receiver 520 may receive information including the monitoring variable operating abnormally and corresponding frequency range from the diagnosis apparatus 300 or from a user. The receiver 520 may transmit the received information to the analyzer 530.

In addition, the receiver 520 may receive magnetic field intensity measured by the at least one near-field measurement probe 510 for the analyzer 530.

The user may utilize and deploy at least one near-field measurement probe 510 based on information about a monitoring variable operating abnormally in the process of applying electromagnetic wave noise and a corresponding frequency range.

The at least one near-field measurement probe 510 may respond sensitively to a frequency range of electromagnetic wave noise in which a monitoring variable operating abnormally is observed. The at least one near-field measurement probe 510 may be positioned near or adjacent an electrical component represented by a function block, and/or near or along a path connected to the electrical component when the electrical component has been identified as being associated with a monitoring variable that operates abnormally in the battery management device 30 from electromagnetic noise, The at least one near-field measurement probe 510 may measure intensity of the magnetic field [A/m] at the location where it is positioned and transmit measured intensity of the magnetic field to the receiver 520.

The analyzer 530 may quantify intensity of electromagnetic wave noise that may adversely affect operation of an electrical component represented by a function block based on intensity of magnetic field [A/m] measured by the near-field measurement probe 510. In the near-field, electromagnetic waves may be measured in the form of an electric field, a magnetic field, and an electromagnetic field, and may appear to be individual or overlapping. Accordingly, the analyzer 530 may qualitatively, correspondingly, or approximately quantify the intensity of electromagnetic wave noise based on measured intensity of magnetic field [A/m].

Figure 6:
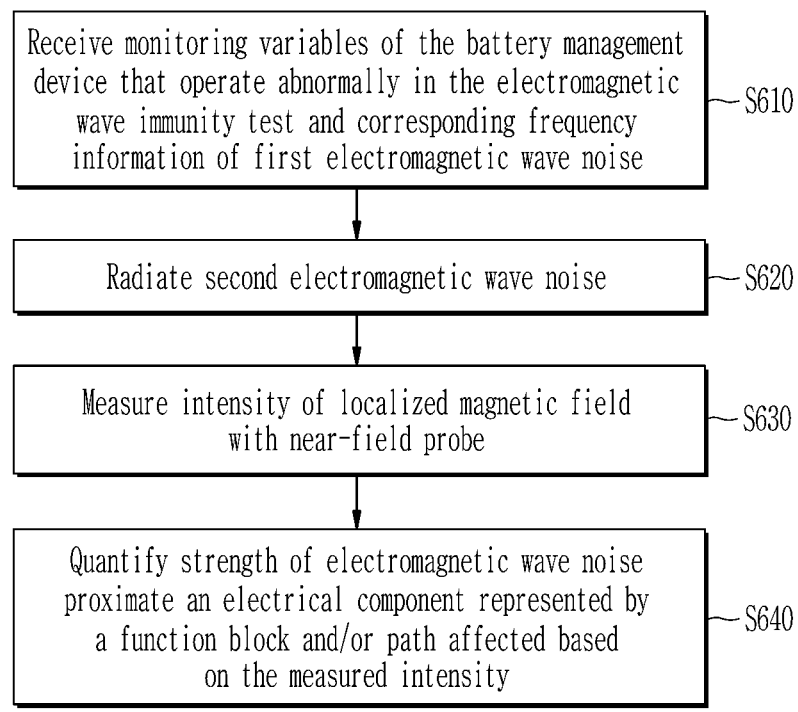
FIG. 6 is a flowchart showing a noise input analysis method according to an embodiment.
Figure 7:
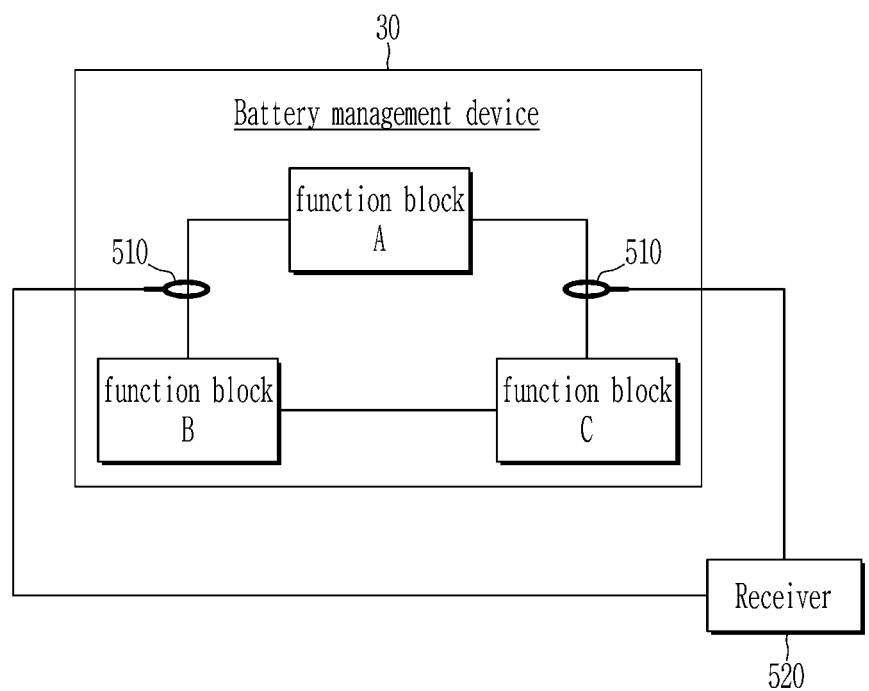
FIG. 7 is a schematic diagram showing an example of arrangement positions of the near-field measurement probe shown in FIG. 5.

FIG. 6 is a flowchart showing a noise penetration analysis method according to an embodiment, and FIG. 7 is a schematic view showing an example of arrangement positions of near-field measurement probes 510.

Referring to FIGS. 5 and 6, noise penetration analysis apparatus 500 may receive monitoring variables of the battery management device 30 that operates abnormally during the electromagnetic wave immunity test and corresponding frequency information of the first electromagnetic wave noise (S610).

At least one near-field measurement probe 510 sensitively responding to a frequency range of electromagnetic wave noise in which an abnormally operating monitoring variable is observed may be positioned near or adjacent an electrical component represented by a function block and/or near or along a path connected to any electrical component represented by any function block associated with the abnormally operating monitoring variable.

For example, as shown in FIG. 7, the battery management device 30 may include many discrete and/or monolithic electrical device components and/or component modules known to those of ordinary skill in the art collectively and/or individually as "electrical components." These electrical components are internal to the DUT, such as internal to battery management device 30 as depicted by FIG. 7. Electrical components may be grouped or act individually to perform functions as represented, for example, by a function block A, a function block B, and a function block C. Function block A, function block B, and function block C may be part of the components of the slave BMSs 100a, 100b, and 100c and the master BMS 200 depicted in FIGS. 2 and 3. If electromagnetic wave noise is radiated by the electromagnetic immunity test apparatus 400 and any electrical component included in the representation by function block A is associated with an abnormally operating monitoring variable of the battery management device 30, at least one near-field measuring probe 510 may be positioned near or adjacent the identified susceptible electrical component or near or on any path connected to that component.

Again, referring to FIGS. 5 and 6, the electromagnetic wave immunity test apparatus 400 may radiate electromagnetic wave noise at a frequency at which an abnormally operating monitoring variable is observed from the battery management device 30.

If the electromagnetic wave noise of a frequency at which an abnormally operating monitoring variable is observed by the electromagnetic wave immunity test apparatus 400 is radiated (S620), the noise penetration analysis apparatus 500 may measure magnetic field intensity at the position of the at least one near-field measurement probe 510 (S630).

The noise penetration analysis apparatus 500 may quantify intensity of electromagnetic wave noise at an electrical component represented by a function block and/or path picking up electromagnetic wave noise of an identified susceptible frequency, based on measured magnetic field intensity where the least one near-field measurement probe 510 is disposed (S640).

If electromagnetic wave noise intensity at or near an electrical component of a function block and/or near or along a path affected by the electromagnetic wave noise is quantified by the noise penetration analysis apparatus 500, it is possible to analyze internal mechanisms of abnormal operation and establish countermeasures.

Figure 8:
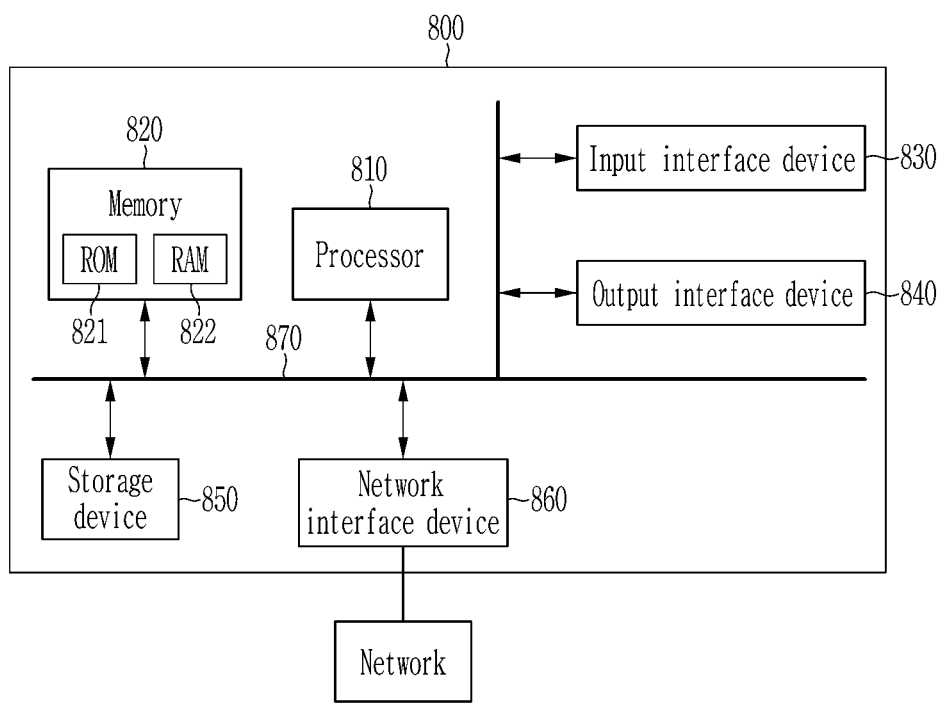
FIG. 8 is a schematic diagram showing an apparatus for analyzing noise input according to another embodiment.

FIG. 8 is a diagram illustrating an apparatus for analyzing noise penetration according to another embodiment.

Referring to FIG. 8, the noise penetration analysis apparatus 800 may represent a computing device in which the noise penetration analysis method described above is implemented.

The noise penetration analysis apparatus 800 may include at least one of a processor 810, a memory 820, an input interface device 830, an output interface device 840, a storage device 850, and a network interface device 860. Each component may be connected by a common bus 870 to communicate with each other. In addition, each component may be connected through an individual interface or individual bus centered on the processor 810, rather than the common bus 870.

The processor 810 may be implemented as various types such as an application processor (AP), a central processing unit (CPU), a graphics processing unit (GPU), etc., and may be any semiconductor device that executes a command stored in the memory 820 or the storage device 850. The processor 810 may execute program commands stored in at least one memory 820 and the storage device 850. Such a processor 810 may be configured to implement the functions and methods described above based on FIGS. 5 to 7.

The memory 820 and the storage device 850 may include various types of volatile or non-volatile storage media. For example, the memory 820 may include read-only memory (ROM) 821 and random access memory (RAM) 822. In an embodiment of the present invention, the memory 820 may be located inside or outside the processor 810, and the memory 820 may be connected to the processor 810 through various known means.

The input interface device 830 may be configured to provide data to the processor 810. For example, the input interface device 830 may provide the intensity of the magnetic field measured through at least one near-field measuring probe 510 to the processor 810.

The output interface device 840 may be configured to output data from the processor 810. For example, the output interface device 840 may output electromagnetic wave noise information regarding an electrical component represented by a function block and/or path affected by the electromagnetic wave noise, quantified by the processor 810.

The network interface device 860 may communicate with other devices through a wired network or a wireless network. For example, the network interface device 850 may transmit and receive signals with the diagnosis device 300 or the battery management device 30.

At least some of the noise input analysis method according to an embodiment of the present disclosure may be implemented as a program or software that runs on a computing device, and the program or software may be stored in a computer-readable medium.

In addition, at least some of the noise input analysis methods according to an embodiment of the present disclosure may be implemented as hardware that can be electrically connected to a computing device.

According to at least one embodiment, it is possible to quantify electromagnetic wave noise at or near an electrical component of a function block affected by electromagnetic wave noise applied for the EMS test among a plurality of electrical components represented by a plurality of function blocks in the battery management device, and analyze and localize susceptibility to abnormal operation from electromagnetic noise, which has the effect of fundamental quality improvement.

In addition, according to at least one embodiment, if a function block representing electrical components is part of an existing battery management device design and is applied to a new model, problems can be anticipated and addressed in advance through simulation in the circuit design stage by knowing internal electromagnetic noise susceptibility at an electric component level, and the cost and time of redesign and remanufacturing can be avoided and saved.

Although the embodiments of the present disclosure have been described in detail above, the scope of the present disclosure is not limited thereto, and various modifications and improvements of those skilled in the art using the basic concepts of the present disclosure defined in the following claims are also included in the present disclosure.

Example embodiments have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electromagnetic noise penetration analysis apparatus for analyzing electromagnetic wave noise penetrating a battery management device that manages at least one battery module and has a plurality of electrical components represented by a plurality of function blocks, the apparatus comprising:

at least one near-field measurement probe positioned adjacent to at least one electrical component of the plurality of electrical components associated with first monitoring data identified as operating abnormally during an electromagnetic wave immunity test among the plurality of electrical components represented by the plurality of function blocks, and configured to measure an intensity of magnetic field while electromagnetic noise of a frequency applied when the first monitoring data was obtained during the electromagnetic wave immunity test is applied to the battery management device; and an analyzer configured to quantify intensity of electromagnetic wave noise penetrating to reach the at least one electrical component represented by at least one function block based on intensity of the magnetic field measured by the at least one near-field measurement probe.

2. The apparatus as claimed in claim 1, further comprising a receiver configured to receive frequency information of electromagnetic noise applied when the first monitoring data was identified as operating abnormally during the electromagnetic wave immunity test along with the first monitoring data.

3. The apparatus as claimed in claim 2, wherein the at least one near-field measurement probe is configured to sensitively respond to the frequency applied when the first monitoring data was identified as operating abnormally.

4. The apparatus as claimed in claim 1, wherein the at least one electrical component represented by the at least one function block is positioned near or along a path connected to the at least one electrical component represented by the at least one function block.

5. An apparatus for quantifying electromagnetic noise penetration into a device under test, the apparatus comprising:

a near-field probe positioned near or adjacent an electrical component among a plurality of electrical components inside the device under test, the near-field probe being configured to measure magnetic field intensity communicated to an analyzer via a receiver to quantify an intensity of electromagnetic noise penetrating the device under test and reaching the electrical component among the plurality of electrical components; and the receiver in communication with the near-field probe.

6. The apparatus as claimed in claim 5, wherein the electrical component among the plurality of electrical components is more susceptible to abnormal operation from penetrating noise at a particular frequency than any other electrical component inside the device under test.

7. The apparatus as claimed in claim 6, wherein the near-field probe is sensitized to the particular frequency.

8. The apparatus as claimed in claim 5, further comprising a diagnosis apparatus in communication with the device under test, and configured to receive data that may operate abnormally when the device under test does not include a near-field probe inside the device under test.

9. The apparatus as claimed in claim 8, wherein the diagnosis apparatus communicates data to the receiver relating to an area where the near-field probe is positioned near circuitry susceptible to abnormal operation from electromagnetic noise penetration.

10. The apparatus as claimed in claim 9, wherein the diagnosis apparatus communicates frequency information relating to susceptible frequencies at which the data that may operate abnormally are more likely to operate abnormally than at any arbitrary frequency.

11. The apparatus as claimed in claim 5, wherein the device under test is a battery management device.

12. The apparatus as claimed in claim 11, wherein the device under test is connected to a battery pack.

13. The apparatus as claimed in claim 5, comprising a diagnosis unit in communication with the device under test configured to generate a warning signal if an abnormality occurs.

14. A method for analyzing electromagnetic wave noise that penetrates into a device under test for testing electromagnetic wave immunity against electromagnetic wave noise penetration, the method comprising:

obtaining first data that operates abnormally during an electromagnetic wave immunity test and corresponding frequency information of an electromagnetic wave noise applied to the device under test when the first data operates abnormally;

measuring magnetic field intensity with at least one near-field measurement probe positioned at or adjacent a position of at least one electrical component represented by at least one function block associated with the first monitoring data among a plurality of function blocks included in the device under test while the electromagnetic wave noise is applied to the device under test; and quantifying an intensity of the electromagnetic wave noise penetrating the device under test to reach the at least one electrical component represented by the at least one function block based on intensity of magnetic field measured by the at least one near-field measurement probe.

15. The method as claimed in claim 14, wherein the at least one near-field measurement probe is configured to respond to a frequency that was applied when the first monitoring data was operating abnormally.

16. The method as claimed in claim 14, wherein the position of the at least one electrical component represented by the at least one function block comprises a position near or along a path connected to the at least one electrical component represented by the at least one function block.

17. The method as claimed in claim 14, wherein the device under test is a battery management device that manages at least one battery module.

18. The method as claimed in claim 14, wherein measurements of magnetic field intensity made with the near-field measurement probe are communicated to a receiver outside the device under test.

19. The method as claimed in claim 14, wherein information relating to origins of any data operating abnormally and any corresponding particularly susceptible frequency is sent to a receiver.

20. The method as claimed in claim 14, wherein a diagnosis apparatus detects any abnormal data and communicates information relating to corresponding frequency of noise penetration causing the abnormal data to a receiver.

* * * * *